United States Patent
Kou et al.

(10) Patent No.: US 12,452,003 B2
(45) Date of Patent: Oct. 21, 2025

(54) HYBRID AUTOMATIC REPEAT REQUEST CODEBOOK GENERATION IN WIRELESS COMMUNICATION SYSTEMS

(71) Applicant: ZTE Corporation, Guangdong (CN)

(72) Inventors: Shuaihua Kou, Shenzhen (CN); Peng Hao, Shenzhen (CN); Wei Gou, Shenzhen (CN); Xing Liu, Shenzhen (CN); Xingguang Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 397 days.

(21) Appl. No.: 18/165,508

(22) Filed: Feb. 7, 2023

(65) Prior Publication Data

US 2023/0224097 A1    Jul. 13, 2023

Related U.S. Application Data

(63) Continuation of application No. PCT/CN2020/107985, filed on Aug. 7, 2020.

(51) Int. Cl.
*H04L 1/1829* (2023.01)
*H04L 5/00* (2006.01)
*H04W 72/232* (2023.01)

(52) U.S. Cl.
CPC .......... *H04L 1/1861* (2013.01); *H04L 5/0053* (2013.01); *H04W 72/232* (2023.01)

(58) Field of Classification Search
CPC ................ H04L 1/1861; H04L 5/0053; H04L 2001/0093; H04L 1/1822; H04L 1/1896; H04L 1/1812; H04L 1/1858; H04W 72/232; H04W 72/23; H04W 72/30; Y02D 30/70
See application file for complete search history.

(56) References Cited

U.S. PATENT DOCUMENTS

| 12,232,130 | B2 * | 2/2025 | Gou | H04W 72/0446 |
| 2018/0152274 | A1 * | 5/2018 | Li | H04W 28/04 |
| 2019/0132104 | A1 * | 5/2019 | Lee | H04W 4/40 |
| 2019/0327755 | A1 * | 10/2019 | Xiong | H04L 5/0046 |

(Continued)

FOREIGN PATENT DOCUMENTS

| CN | 103210604 A | 7/2013 |
| CN | 109478978 A | 3/2019 |

(Continued)

OTHER PUBLICATIONS

OPPO, "Summary#1 on UCI enhancements for R16 URLLC," 3GPP TSG RAN WG1 #100-e, R1-2001016, e-Meeting, Feb. 24-Mar. 6, 2020 (51 pages).

(Continued)

*Primary Examiner* — John D Blanton
(74) *Attorney, Agent, or Firm* — Perkins Coie LLP

(57) ABSTRACT

Methods, systems, and devices for hybrid automatic repeat request (HARQ) codebook generation in mobile communication technology are described. An example method for wireless communication includes receiving, by a wireless device from a network node, a control message comprising one or more indicators corresponding to a plurality of control channels in a service of one or more services, and determining, based on the one or more indicators, a HARQ codebook for the one or more services, wherein the service further comprises a plurality of data channels corresponding to the plurality of control channels.

16 Claims, 10 Drawing Sheets

(56) References Cited

U.S. PATENT DOCUMENTS

| | | | |
|---|---|---|---|
| 2020/0213046 A1* | 7/2020 | Wang | H04L 1/1819 |
| 2021/0176012 A1* | 6/2021 | Xu | H04W 72/23 |
| 2021/0314095 A1* | 10/2021 | Gao | H04L 1/1614 |
| 2022/0052790 A1* | 2/2022 | Lei | H04L 5/0053 |
| 2022/0279546 A1* | 9/2022 | Guthmann | C23F 11/184 |
| 2023/0049911 A1* | 2/2023 | Hu | H04L 12/1868 |
| 2023/0077055 A1 | 3/2023 | Gou et al. | |
| 2023/0224097 A1* | 7/2023 | Kou | H04W 72/23 370/329 |

FOREIGN PATENT DOCUMENTS

| | | |
|---|---|---|
| CN | 109699075 A | 4/2019 |
| CN | 110493879 A | 11/2019 |
| CN | 110876204 A | 3/2020 |
| CN | 111034093 A | 4/2020 |
| EP | 4132155 A | 2/2023 |
| WO | 2018141178 A1 | 8/2018 |
| WO | 2019160483 A1 | 8/2019 |

OTHER PUBLICATIONS

International Search Report and Written Opinion for International Application No. PCT/CN2020/107985, mailed on Apr. 29, 2021 (9 pages).

Extended European Search Report for European Patent Application No. 20948226.4, mailed Nov. 23, 2023 (14 pages).

NEC, "UCI enhancements for NR URLLC," 3GPP TSG RAN WG1 #98, R1-1908280, Prague, Czech Republic, Aug. 26-30, 2019 (7 pages).

Office Action for Canadian Patent Application No. 3,189,936, mailed Sep. 10, 2024 (6 pages).

Huawei et al., "Corrections on bandwidth part and CA," 3GPP TSG RAN Wg 1 Meeting #94bis, R1-1810112, Chengdu, China, Oct. 8-12, 2018 (14 pages).

Communication pursuant to Article 94(3) EPC for European Patent Application No. 20948226.4, mailed Oct. 17, 2024 (12 pages).

Office Action for Chinese Patent Application No. 202080104100.2, mailed Mar. 28, 2025 (25 pages).

Communication pursuant to Article 94(3) EPC for European Patent Application No. 20948226.4, mailed Apr. 3, 2025 (9 pages).

Office Action for Korean Patent Application No. 10-2023-7004452, mailed Jun. 5, 2025 with English summary (7 pages).

ITL, "Physical layer procedure for NR V2X," 3GPP TSG RAN WG1 #98bis Chongqing, China, Oct. 14-20, 2019, R1-1910797, 6 pages.

* cited by examiner

640 ▸

642 — Transmitting, by a network node to a wireless device, a control message comprising one or more indicators corresponding to a first plurality of control channels in a first service and a second plurality of control channels in a second service

FIG. 6D ions, and the claims.

HYBRID AUTOMATIC REPEAT REQUEST CODEBOOK GENERATION IN WIRELESS COMMUNICATION SYSTEMS

CROSS REFERENCE TO RELATED APPLICATIONS

This patent document is a continuation of and claims benefit of priority to International Patent Application No. PCT/CN2020/107985, filed on Aug. 7, 2020. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an increased number of users and devices, as well as support for higher data rates.

SUMMARY

This document relates to methods, systems, and devices for hybrid automatic repeat request (HARQ) codebook generation in mobile communication technology, including 5th Generation (5G) and New Radio (NR) communication systems.

In one exemplary aspect, a wireless communication method is disclosed. The method includes receiving, by a wireless device from a network node, a control message comprising one or more indicators corresponding to a plurality of control channels in a service of one or more services, and determining, based on the one or more indicators, a hybrid automatic repeat request (HARQ) codebook for the one or more services, wherein the service further comprises a plurality of data channels corresponding to the plurality of control channels.

In another exemplary aspect, a wireless communication method is disclosed. The method includes transmitting, by a network node to a wireless device, a control message comprising one or more indicators corresponding to a plurality of control channels in a service of one or more services, wherein the wireless device is configured to determine a hybrid automatic repeat request (HARQ) codebook for the one or more services based on the one or more indicators, and wherein the service further comprises a plurality of data channels corresponding to the plurality of control channels.

In yet another exemplary aspect, a wireless communication method is disclosed. The method includes receiving, by a wireless device from a network node, a control message comprising one or more indicators corresponding to a first plurality of control channels in a first service and a second plurality of control channels in a second service, and determining, based on the one or more indicators, a hybrid automatic repeat request (HARQ) codebook for the first service and the second service.

In yet another exemplary aspect, a wireless communication method is disclosed. The method includes transmitting, by a network node to a wireless device, a control message comprising one or more indicators corresponding to a first plurality of control channels in a first service and a second plurality of control channels in a second service, wherein the wireless device is configured to determine a hybrid automatic repeat request (HARQ) codebook for the first service and the second service.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIGS. 6A-6D show examples of wireless communication methods.

DETAILED DESCRIPTION

In wireless communication systems, a UE receives or is configured to receive one or more multicast services, e.g. a Multicast and Broadcast Service (MBS) or Multimedia Broadcast Multicast Service (MBMS), which are representative of generic multicast services in this document. In this framework for a multicast service, a Physical Downlink Control Channel (PDCCH) and the corresponding scheduled Physical Downlink Shared Channel (PDSCH) may be received by more than one UE. For a unicast service, a PDCCH and the corresponding scheduled PDSCH may be received only by one UE. Furthermore, UEs can be configured to receive both multicase and unicast services.

In existing implementations, a Downlink Control Information (DCI) format or a DCI is carried by a PDCCH and one or more transport blocks are carried by the PDSCH. For the purposes of exposition, the descriptions in this document assume that the DCI is equal to a PDCCH and a transport block is equal to a PDSCH. In an example, a Downlink Assignment Indicator (DAI) in a PDCCH is equal to a DAI in a DCI format. In another example, the HARQ-ACK information bits corresponding to a transport block are equivalent to HARQ-ACK information bits corresponding to a PDSCH.

Embodiments of the disclosed technology are directed to a UE receiving both multicast and unicast service, determining how to set the DAI in the PDCCH for scheduling the multicast and unicast services, and generating a HARQ-ACK codebook for both multicast service and unicast service together.

Figure 1:
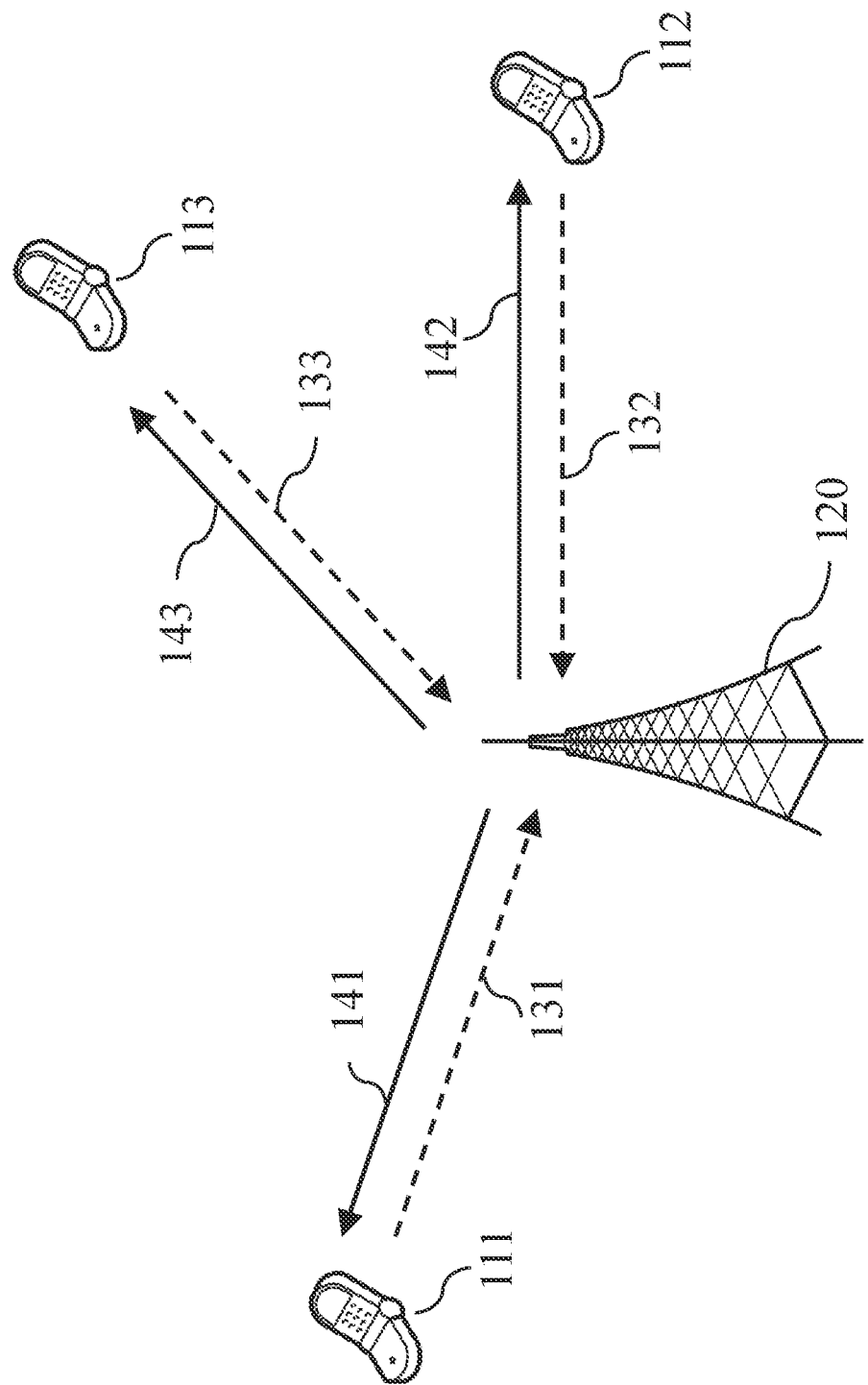
FIG. 1 shows an example of a network node (e.g., base station or gNodeB) and a wireless device (e.g., user equipment (UE)) in wireless communication.

FIG. 1 shows an example of a wireless communication system (e.g., an LTE, 5G or New Radio (NR) cellular network) that includes a BS 120 and one or more user equipment (UE) 111, 112 and 113. In some embodiments, the downlink transmissions (141, 142, 143) include a DCI format comprising one or more DAI. In response to receiving the DCI comprising the DAI and generating a HARQ-ACK codebook, the UEs transmit (131, 132, 133) the HARQ-ACK codebook to the BS 120. The UE may be, for example, a smartphone, a tablet, a mobile computer, a machine to machine (M2M) device, a terminal, a mobile device, an Internet of Things (IoT) device, and so on.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Example Embodiments for HARQ Codebook Generation for MBS Sessions

In some embodiments, the downlink assignment indicator (DAI) in a downlink control information (DCI) is used to indicate the number of physical downlink control channel (PDCCH) in the order of the PDSCH reception starting time for the same PDCCH monitoring occasion and the same serving cell, and/or serving cell, and/or the PDCCH monitoring occasion. A PDCCH is transmitted on a PDCCH monitoring occasion in a serving cell, and thus, the PDCCH corresponds to the {serving cell, PDCCH monitoring occasion}-pair. For example, PDCCH 0 is transmitted on PDCCH monitoring occasion 0 in serving cell 0. PDCCH 0 corresponds to the {serving cell 0, PDCCH monitoring occasion 0}-pair. The number of PDCCH is equal to the number of {serving cell, PDCCH monitoring occasion}-pairs.

In some embodiments, a first DAI in a DCI indicates the number of PDCCH for scheduling a MBS session in the order of PDSCH reception starting time for the same PDCCH monitoring occasion and the same serving cell, and/or serving cell, and/or PDCCH monitoring occasion. In an example, a first DAI in a DCI indicates the number of PDCCH per MBS session. In another example, a first DAI in a DCI indicates the number of PDCCH for scheduling a MBS session and the PDCCH for the other MBS sessions is not taken into account.

In some embodiments, a first DAI in a DCI format indicates the accumulative number of PDCCH for a MBS session. A value of the first DAI in a DCI denotes the accumulative number of PDCCH that schedules one or more PDSCHs or semi-persistent scheduling (SPS) PDSCH release for a MBS session, in the order (e.g., descending order or ascending order) of PDSCH reception starting time for the same serving cell and PDCCH monitoring occasion, and/or serving cell index, and/or PDCCH monitoring occasion. For example, a value of the first DAI in DCI formats denotes the accumulative number of PDCCH first in increasing order of PDSCH reception starting time for the same serving cell and PDCCH monitoring occasion, and second in ascending order of serving cell index, and then in ascending order of PDCCH monitoring occasion index. The accumulative number of PDCCH is the total number of the PDCCH from the first PDCCH that schedules PDSCH by the network to the current PDCCH for the MBS session.

In some embodiments, the value of the first DAI in DCI format denotes the accumulative number of PDCCH according to Table 1 with the assumption that the length of DAI field in DCI is 2, where D is the accumulative number of PDCCH and N is the number of the value of the first DAI with $N=2^K$, and where K is the length of the DAI field in DCI.

TABLE 1

Example of DAI denoting the accumulative number of PDCCH

| Value of first DAI | Accumulative number of PDCCH |
|---|---|
| 1 | (D − 1) mod N + 1 = 1 |
| 2 | (D − 1) mod N + 1 = 2 |
| 3 | (D − 1) mod N + 1 = 3 |
| 4 | (D − 1) mod N + 1 = 4 |

Figure 2:
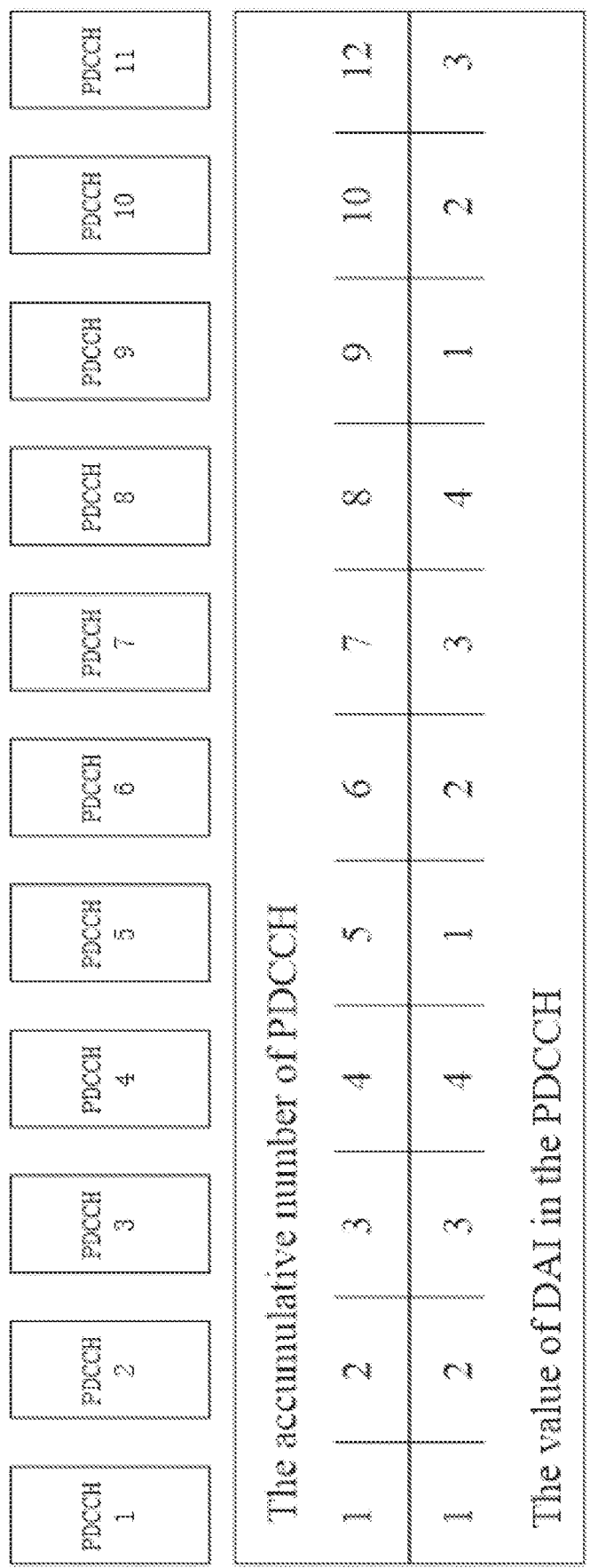
FIG. 2 shows an example of a downlink assignment indicator (DAI) for a multicast and broadcast service (MBS) session.

FIG. 2 shows an example of the value of DAI for an MBS session. As shown therein, there are 11 PDCCH (denoted as PDCCH 1~11, respectively) for scheduling PDSCH for a MBS session. PDCCH 1 is the first PDCCH that schedules PDSCH for the MBS session. For PDCCH 1, there is a total of 1 PDCCH counting from PDCCH 1. Therefore, the accumulative number of PDCCH is 1, which is denoted by a DAI value 1 in PDCCH 1 (as shown in Table 1). Similarly, for PDCCH 2, there are a total of 2 PDCCHs counting from PDCCH 1, and therefore the accumulative number of PDCCH is 2, which is denoted by a DAI value 2 in PDCCH 2 (as shown in Table 1). For PDCCH 5, there are a total of 5 PDCCHs counting from PDCCH 1, and therefore the accumulative number of PDCCH is 5, which is denoted by a DAI value 1 in PDCCH 5.

In some embodiments, the value of a first DAI in a DCI for scheduling a MBS session is set according to a cyclic sequence. The value of the DAI in the first DCI that the network transmits to a UE for scheduling the MBS session is set to be the first value of the sequence. The value of the DAI in the next DCI for scheduling the MBS session is set to be the next value of the sequence, and so on. When the value of the DAI in a DCI for scheduling the MBS session is set to be the last value of the sequence, the value of the DAI in the next DCI for scheduling the MBS session is set to be the first value of the sequence. In an example, assume that the sequence includes 4 values, i.e., 1, 2, 3, 4. The value of the DAI in the first PDCCH that the network transmits to a UE for scheduling the MBS session is set to 1. Still referring to FIG. 2, the first PDCCH is PDCCH 1. Therefore, the DAI of PDCCH 1 is 1. The DAI of PDCCH 2, which is next to PDCCH 1, is 2. Similarly, the DAI of PDCCH 4 is 4 and the DAI of PDCCH 5 is 1. The values of the other DAI of PDCCHs are shown in FIG. 2.

In some embodiments, a HARQ-ACK codebook for one or more MBS sessions is generated by a UE. The HARQ-ACK codebook is carried by a PUCCH or a PUSCH. The HARQ-ACK codebook is determined based on one or more PDSCH sets. The HARQ-ACK codebook includes one or more sub-codebooks for one or more PDSCH sets, wherein one sub-codebook corresponds to one PDSCH set and one PDSCH set corresponds to one MBS session. That is, a sub-codebook is generated for a PDSCH set for a MBS session. These sub-codebooks for one or more PDSCH sets are concatenated in the order of the MBS sessions to form the HARQ-ACK codebook.

In some embodiments, a PDSCH set includes one or more PDSCH for the corresponding MBS. A sub-codebook for a PDSCH set is generated according to DAI in the PDCCHs. If N (N>0) bits are generated for a PDSCH, the first N bits in the sub-codebook correspond to the first PDSCH in the PDSCH set and the second N bits in the sub-codebook correspond to the second PDSCH in the PDSCH set, and so on. If a PDCCH with a DAI is missed, N bits of NACK information is generated for the corresponding PDSCH. In some embodiments, one or more of the following enumerations can be defined:

The first PDSCH in a PDSCH set is the earliest PDSCH for which UE has not reported HARQ-ACK;

The first PDSCH in a PDSCH set is the latest PDSCH scheduled by a DCI with the first value for the DAI which is not later than the PDSCH for which the UE has not reported HARQ-ACK;

The last PDSCH is the latest PDSCH that is before a time interval before the PUCCH or PUSCH carrying the HARQ-ACK codebook; and The last PDSCH is the PDSCH which is the scheduled by a PDCCH indicating a PUCCH, where the generated HARQ-ACK codebook is transmitted on the PUCCH.

In some embodiments, the time interval is configured by the network. In other embodiments, the time interval is the PDSCH processing time defined in the specification.

Figure 3:
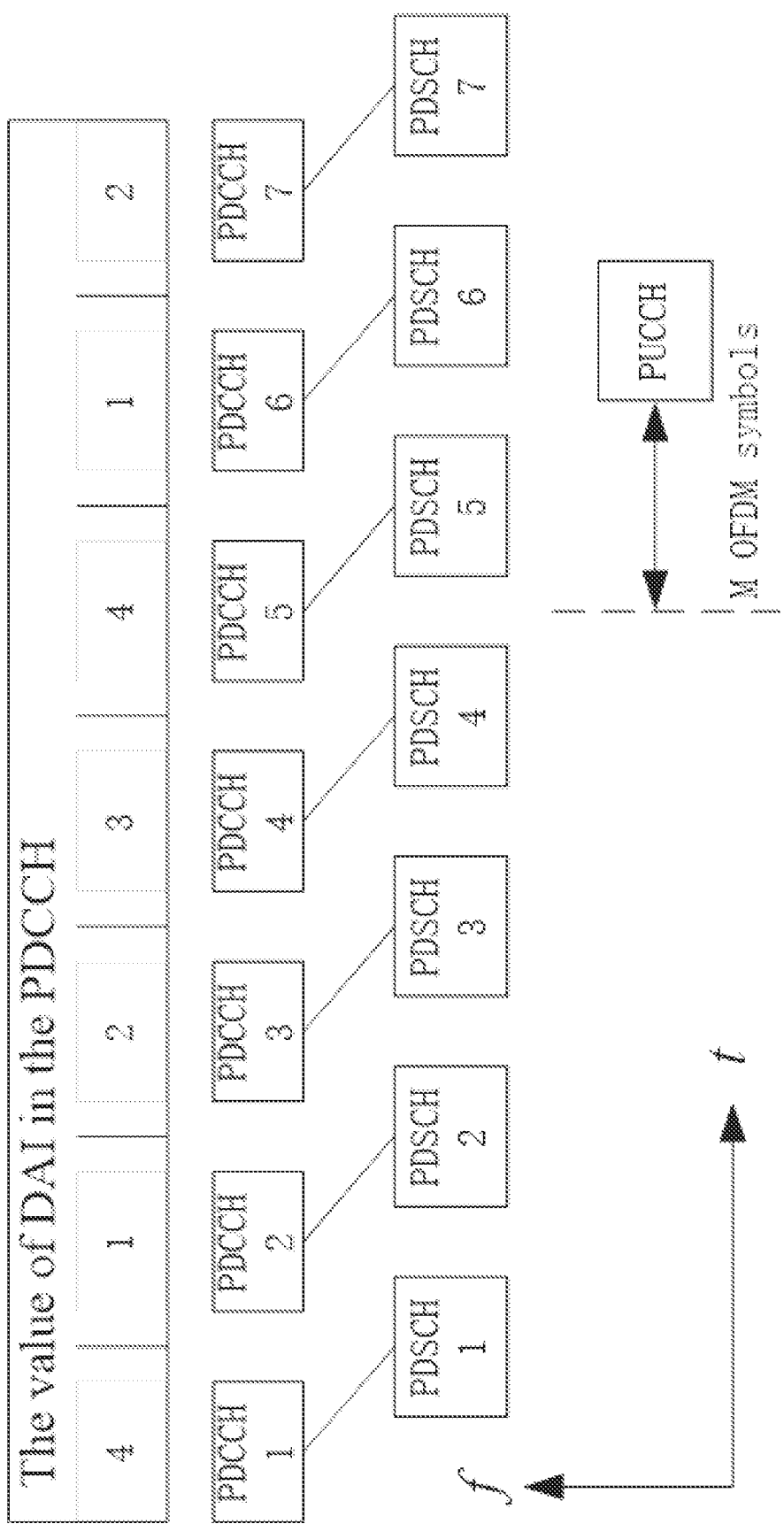
FIG. 3 shows an example of codebook generation.

FIG. 3 shows an example of HARQ-ACK codebook generation. As shown therein, there are 7 PDCCHs denoted by PDCCH 1~7 respectively. Each PDCCH schedules a PDSCH for the same MBS session. The value of DAI in PDCCHs 1~7 are 4, 1, 2, 3, 4, 1, 2, respectively. In this example, the HARQ-ACK corresponding to PDCCH 2 (or PDSCH 2) has been reported by the UE.

In some embodiments, a HARQ-ACK sub-codebook is generated for a PDSCH set for the MBS session. In some embodiments, the first PDSCH in the PDSCH set is the earliest PDSCH for which UE has not reported HARQ-ACK. Since the HARQ-ACK for PDSCH 2 has been reported by the UE, the first PDSCH for which UE has not reported HARQ-ACK is PDSCH 3. The last PDSCH is the latest PDSCH that is before a time interval before the PUCCH or PUSCH carrying the HARQ-ACK codebook. The defined time interval is M OFDM symbols (M>0). Since the PDSCH 4 is the latest PDSCH that is before M OFDM symbols before the PUCCH, the last PDSCH is PDSCH 4. In this case, the PDSCH sets includes PDSCH 3 and PDSCH 4. If a HARQ-ACK information bit is generated for a PDSCH, 2 bits are generated for the PDSCH set. According to the value of DAI, the first bit corresponds to the first PDSCH, e.g. PDSCH 3, and the second bit corresponds to the second PDSCH, e.g. PDSCH 4.

The first PDSCH in the PDSCH set is the latest PDSCH scheduled by a DCI with a first value for the DAI which is not later than the PDSCH for which the UE has not reported HARQ-ACK. The HARQ-ACK for PDSCH 3 has not been reported by the UE and PDSCH 2 scheduled by PDCCH 2 with the DAI value of 1 is the latest PDSCH and also is not later than PDSCH 3. Therefore, PDSCH 2 is the first PDSCH in the PDSCH set. The last PDSCH is the PDSCH which is the scheduled by a PDCCH indicating a PUCCH, where the generated HARQ-ACK codebook is transmitted on the PUCCH. The PUCCH resource in FIG. 3 is indicated by PDCCH 5 and used to transmit the generated HARQ-ACK codebook. PDSCH 5, which is scheduled by PDCCH 5 is the last PDSCH in the PDSCH set. In this case, the PDSCH set includes PDSCH 2, PDSCH 3, PDSCH 4 and PDSCH 5. If a HARQ-ACK information bit is generated for a PDSCH, 4 bits are generated for the PDSCH set. According to the value of DAI, the first bit corresponds to the first PDSCH, e.g. PDSCH 2, the second bit corresponds to the second PDSCH, e.g. PDSCH 3, the third bit corresponds to the third PDSCH, e.g. PDSCH 4, and the fourth bit corresponds to the second PDSCH, e.g. PDSCH 5. If a PDCCH with a DAI is missed, NACK information is generated for the corresponding PDSCH. For example, if the UE only detects PDCCH 3 and PDCCH 5, then according to the DAI value in PDCCH 3 (i.e., 2) and the DAI value in PDCCH 5 (i.e., 4), the UE can determine that there is a PDCCH with a DAI value of 3 that the UE does not detect. Thus, the UE can determine that a PDCCH with a DAI value of 3 is missed. Therefore, NACK information should be generated for the PDSCH, and the NACK information should be the third bit according to the value of DAI.

In some embodiments, a parameter or configuration is used to identify the transmission of MBS session; e.g., a radio network temporary identifier (RNTI), a logical channel identity, a search space, a control resource set, a physical downlink control channel (PDCCH) monitoring occasion, a downlink control information (DCI) format, a PDCCH candidate, a control channel element (CCE) index, a multicast traffic channel (MTCH), a temporary mobile group identity (TMGI), etc. A PDSCH set corresponds to one MBS session, and thus a PDSCH set may correspond to the parameter or the configuration used to identify the transmission of the MBS session.

Example Embodiments for HARQ Codebook Generation for MBS and Unicast Sessions

In some embodiments, a set of PDCCH includes one or more PDCCHs for scheduling PDSCH reception or SPS PDSCH release for which the UE transmits HARQ-ACK information in a same PUCCH in a slot or sub-slot. The set of PDCCH includes one or more PDCCH for scheduling PDSCH reception or SPS PDSCH release for unicast service. The set of PDCCH includes one or more PDCCH for scheduling PDSCH reception or SPS PDSCH release for one or more MBS sessions.

For a PDCCH for scheduling MBS in the set, a first DAI indicates the accumulative number of PDCCH for scheduling MBS up to the current PDCCH in the order (e.g. descending order or ascending order) of PDSCH reception starting time, and/or serving cell index, and/or MBS session, and/or PDCCH monitoring occasion. For example, a first DAI indicates the accumulative number of PDCCH for MBS up to the current PDCCH, first in the ascending order of MBS session index for the same PDCCH monitoring occasion and the same serving cell, second in the ascending order of serving cell index, then in the ascending order of PDCCH monitor occasion index. For another example, a first DAI indicates the accumulative number of PDCCH for MB S up to the current PDCCH, first in the ascending order of serving cell index for the same MBS session for the same PDCCH monitoring, second in the ascending order of MBS session index, and then in the ascending order of PDCCH monitoring occasion index.

In some embodiments, a first DAI in a PDCCH on a PDCCH monitoring occasion for scheduling MBS indicates the accumulative number of PDCCH for MBS counting from the first PDCCH for scheduling MBS on the same PDCCH monitoring occasion up to current PDCCH in the order (e.g. descending order or ascending order) of PDSCH reception starting time, and/or serving cell, and/or PDCCH monitoring occasion. The first DAI in the PDCCH for MBS is updated from PDCCH monitoring occasion to PDCCH monitoring occasion. For example, a first DAI in a PDCCH on a PDCCH monitoring occasion for scheduling MBS indicates the accumulative number of PDCCH for MBS counting from the first PDCCH on the same PDCCH monitoring occasion for scheduling MBS up to current PDCCH, first in ascending order of MBS session index, second in ascending order of serving cell index, then in ascending order of the PDCCH monitoring occasion index.

For a PDCCH for scheduling MBS on a PDCCH monitoring occasion in the set, a second DAI indicates the total number of PDCCH on the PDCCH monitoring occasion for scheduling MBS. The second DAI in the PDCCH for MBS is updated from PDCCH monitoring occasion to PDCCH monitoring occasion. The second DAI in each PDCCH for scheduling MBS on the PDCCH monitoring occasion in the set are the same.

For a PDCCH for scheduling unicast service for a UE in the set, a first DAI indicates the accumulative number of PDCCH including PDCCH for scheduling MBS that the UE receives and PDCCH for scheduling unicast service for the UE up to the current PDCCH in the order (e.g. descending order or ascending order) of PDSCH reception starting time, and/or serving cell index, and/or MBS session, and/or PDCCH monitoring occasion, and/or service type. The service type includes multicast service and unicast service. For example, a first DAI in a PDCCH scheduling unicast service indicates the accumulative number of PDCCH including PDCCH for scheduling unicast and PDCCH scheduling multicast that the UE receives up to the PDCCH, first in the order of service type (e.g. first MBS service then unicast service), second in the ascending order of serving cell index, then in the ascending order of PDCCH monitoring occasion index, where an ascending order of MBS session index is for multiple MBS sessions. For another example, a first DAI in a PDCCH scheduling unicast service indicates the accumulative number of PDCCH including PDCCH for scheduling unicast and PDCCH scheduling multicast up to the PDCCH, first in the ascending order of serving cell index, second in the order of service type (e.g. first MBS service then unicast service), then in the ascending order of PDCCH monitoring occasion index, where an ascending order of MBS session index is for multiple MBS sessions.

For a PDCCH for scheduling unicast service for a UE on a PDCCH monitoring occasion in the set, a second DAI indicates the total number of PDCCH including PDCCH for MBS that the UE receives and PDCCH for unicast service for the UE on the PDCCH monitoring occasion. The second DAI in the PDCCH for scheduling unicast service is updated from PDCCH monitoring occasion to PDCCH monitoring occasion. The second DAI in each PDCCH for scheduling unicast on a PDCCH monitoring in the set are the same.

Figure 4:
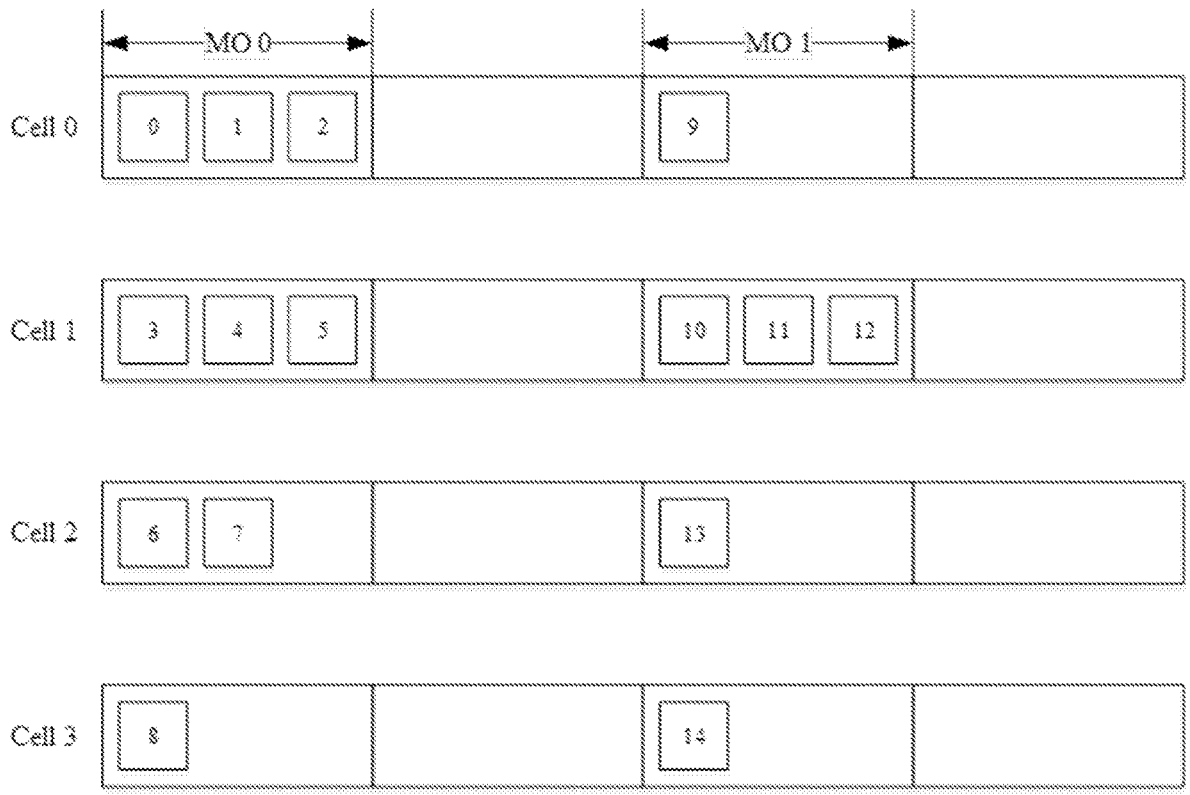
FIG. 4 shows an example of a DAI for 3 MBS sessions and a unicast session.

FIG. 4 is an example of the value of DAI for three MBS sessions and unicast service. As shown therein, there are 3 MBS sessions denoted by MBS A, MBS B, and MBS C, where MBS A index <MBS B index <MBS C index, and 4 cells (denoted by cell 0~3, respectively) configured for 3 UEs (denoted by UE 1, UE 2, UE 3, respectively). In the example shown in FIG. 4, UE 1 receives MBS A and MBS B simultaneously. For UE 1, the set of PDCCH includes PDCCH for scheduling unicast service for UE 1 and PDCCH for scheduling MBS A and PDCCH for MBS B. UE 2 receives MBS B and MBS C simultaneously. For UE 2, the set of PDCCH includes PDCCH for scheduling unicast service for UE 2 and PDCCH for scheduling MBS B and PDCCH for scheduling MBS C. UE 3 receives MBS A, MBS B and MBS C simultaneously. For UE 3, the set of PDCCH includes PDCCH for scheduling unicast service for UE 3 and PDCCH for scheduling MBS A and PDCCH for scheduling MBS B and PDCCH scheduling for MBS C.

Still referring to FIG. 4, there are 15 PDCCHs (denoted by PDCCH 0~14, respectively) for scheduling MBS or unicast service. PDCCH 0 transmitted on PDCCH monitoring 0 in cell 0 schedules MBS A. PDCCH 1 transmitted on PDCCH monitoring 0 in cell 0 schedules unicast service for UE 1. PDCCH 2 transmitted on PDCCH monitoring 0 in cell 0 schedules MBS C. PDCCH 3 transmitted on PDCCH monitoring 0 in cell 1 schedules unicast service for UE 2. PDCCH 4 transmitted on PDCCH monitoring 0 in cell 1 schedules unicast service for UE 1. PDCCH 5 transmitted on PDCCH monitoring 0 in cell 1 schedules unicast service for UE 3. PDCCH 6 transmitted on PDCCH monitoring 0 in cell 2 schedules MBS B. PDCCH 7 transmitted on PDCCH monitoring 0 in cell 2 schedules unicast service for UE 2. PDCCH 8 transmitted on PDCCH monitoring 0 in cell 3 schedules unicast service for UE 3. PDCCH 9 transmitted on PDCCH monitoring 1 in cell 0 schedules unicast service for UE 1. PDCCH 10 transmitted on PDCCH monitoring 1 in cell 1 schedules unicast service for UE 2. PDCCH 11 transmitted on PDCCH monitoring 1 in cell 1 schedules MBS B. PDCCH 12 transmitted on PDCCH monitoring 1 in cell 1 schedules MBS A. PDCCH 13 transmitted on PDCCH monitoring 1 in cell 2 schedules unicast service for UE 1. PDCCH 14 transmitted on PDCCH monitoring 1 in cell 3 schedules unicast service for UE 3.

A first DAI in a DCI for MBS indicates the accumulative number of PDCCH in the set for MBS up to the current PDCCH, first in the ascending order of MBS session index for the same serving cell and the same PDCCH monitoring occasion, second in the ascending order of serving cell index for the same PDCCH monitoring occasion, then in the ascending order of PDCCH monitor occasion index.

The ascending order of MBS session index is MBS A, MBS B, and MBS C based on MBS A index <MBS B index <MBS C index. The ascending order is cell 0, cell 1, cell 2, cell 3, and the ascending order of PDCCH monitoring occasion is PDCCH monitoring occasion 0, PDCCH monitoring occasion 1.

According the rule, PDCCH 0 is the first PDCCH for scheduling MBS due to corresponding MBS session, serving cell, and PDCCH monitoring occasion (i.e. MBS session A, cell 0, MO 0). The value of the first DAI in PDCCH 0 is 1 according to Table 1, which indicates the accumulative number of PDCCH for scheduling MBS is 1. PDCCH 6 is the second PDCCH for scheduling MBS due to corresponding MBS session, serving cell, and PDCCH monitoring occasion (i.e. MBS session B, cell 0, MO 0). The value of the first DAI in PDCCH 6 is 2 according to Table 1, which indicates the accumulative number of PDCCH for scheduling MBS is 2. PDCCH 2 is the third PDCCH for scheduling MBS due to corresponding MBS session, serving cell, and PDCCH monitoring occasion (i.e. MBS session C, cell 2, MO 0). The value of the first DAI in PDCCH 2 is 3 according to Table 1, which indicates the accumulative number of PDCCH for scheduling MBS is 2. PDCCH 12 is the fourth PDCCH for scheduling MBS due to corresponding MBS session, serving cell, and PDCCH monitoring occasion (i.e. MBS session A, cell 1, MO 1). The value of the first DAI in PDCCH 12 is 4 according to Table 1, which indicates the accumulative number of PDCCH for scheduling MBS is 4. PDCCH 11 is the fifth PDCCH for scheduling MBS due to corresponding MBS session, serving cell, and PDCCH monitoring occasion (i.e. MBS session B, cell 1, MO 1). The value of the first DAI in PDCCH 11 is 1 according to Table 1, which indicates the accumulative number of PDCCH for scheduling MBS is 5.

There are three PDCCHs in total for scheduling MBS on the PDCCH monitoring occasion 0 (e.g. PDCCH 0 for scheduling MBS A, PDCCH 2 for scheduling MBS C and PDCCH 6 for scheduling MBS B). Therefore, the value of second DAI in each of the three PDCCHs is 3.

There are two PDCCHs in total for scheduling MBS on the PDCCH monitoring occasion 1 (e.g. PDCCH 11 for scheduling MBS B and PDCCH 12 for scheduling MBS A). Therefore, the value of second DAI in each of the two PDCCHs is 2.

A first DAI in a PDCCH scheduling unicast service indicates the accumulative number of PDCCH including PDCCH for scheduling unicast and PDCCH scheduling multicast that the UE receives up to the PDCCH, first in the order of service type (e.g. first MBS service then unicast service), second in the ascending order of serving cell index, then in the ascending order of PDCCH monitoring occasion index, where an ascending order of MBS session index is for multiple MBS sessions.

For UE 1, there are four PDCCHs for scheduling unicast for UE 1 (e.g. PDCCH 1, PDCCH 4, PDCCH 9, and PDCCH 13) and four PDCCHs for scheduling MBS that UE 1 receives (e.g. PDCCH 0 for scheduling MBS A, PDCCH 6 for scheduling MBS B, PDCCH 11 for scheduling MBS B, and PDCCH 12 for scheduling MBS A). After arranging these PDCCHs according to the rule, the order of these PDCCHs is PDCCH 0, PDCCH 1, PDCCH 4, PDCCH 6, PDCCH 9, PDCCH 12, PDCCH 11, and PDCCH 13. Therefore, according to Table 1, the value of the first DAI in the PDCCH for scheduling unicast for UE 1 (e.g. PDCCH 1, PDCCH 4, PDCCH 9, and PDCCH 13) are 2, 3, 1, 4, respectively, which denotes the accumulative number of PDCCH is 2, 3, 5, 8, respectively.

For UE 1, there are four PDCCH in total including PDCCH for scheduling MBS that UE 1 receives (e.g. PDCCH 0 for scheduling MBS A and PDCCH 6 for scheduling MBS B) and PDCCH for scheduling unicast service for UE 1 (e.g. PDCCH 1 and PDCCH 4) on PDCCH monitoring occasion 0. Therefore, the value of the second DAI in the PDCCH transmitted on PDCCH monitoring occasion 0 for scheduling unicast for UE 1 (e.g. PDCCH 1 and PDCCH 4) is 4 according to Table 1. Similarly, there are four PDCCH in total including PDCCH for scheduling MBS that UE 1 receives (e.g. PDCCH 12 for scheduling MBS A and PDCCH 11 for scheduling MBS B) and PDCCH for scheduling unicast service for UE 1 (e.g. PDCCH 9 and PDCCH 13) on PDCCH monitoring occasion 1. Therefore, the value of the second DAI in the PDCCH transmitted on PDCCH monitoring occasion 1 for scheduling unicast for UE 1 (e.g. PDCCH 9 and PDCCH 13) is 4 according to Table 1.

For UE 2, there are three PDCCHs in total for scheduling unicast for UE 2 (e.g. PDCCH 3, PDCCH 7, and PDCCH 10) and three PDCCHs for scheduling MBS that UE 2 receives (e.g. PDCCH 2 for scheduling MBS C, PDCCH 6 for scheduling MBS B, PDCCH 11 for scheduling MBS B). After arranging these PDCCHs according to the rule, the order of these PDCCHs is PDCCH 2, PDCCH 3, PDCCH 6, PDCCH 7, PDCCH 11, and PDCCH 10. Therefore, according to Table 1, the value of the first DAI in the PDCCH for scheduling unicast for UE 2 (e.g. PDCCH 3, PDCCH 7, and PDCCH 10) are 2, 4, 2, respectively, which denotes the accumulative number of PDCCH is 2, 4, 6, respectively.

For UE 2, there are four PDCCHs in total including PDCCHs for scheduling MBS that UE 2 receives (e.g. PDCCH 2 for scheduling MBS C and PDCCH 6 for scheduling MBS B) and PDCCH for scheduling unicast service for UE 2 (e.g. PDCCH 3 and PDCCH 7) on PDCCH monitoring occasion 0. Therefore, the value of the second DAI in the PDCCH transmitted on PDCCH monitoring occasion 0 for scheduling unicast for UE 2 (e.g. PDCCH 3 and PDCCH 7) is 4 according to Table 1. Similarly, there are two PDCCH in total including PDCCH for scheduling MBS that UE 2 receives (e.g. PDCCH 11 for scheduling MBS B) and PDCCH for scheduling unicast service for UE 2 (e.g. PDCCH 10) on PDCCH monitoring occasion 1. Therefore, the value of the second DAI in the PDCCH transmitted on PDCCH monitoring occasion 1 for scheduling unicast for UE 2 (e.g. PDCCH 10) is 2 according to Table 1.

For UE 3, there are three PDCCHs in total for scheduling unicast for UE 3 (e.g. PDCCH 5, PDCCH 8, and PDCCH 14) and five PDCCHs for scheduling MBS that UE 3 receives (e.g. PDCCH 0 for scheduling MBS A, PDCCH 2 for scheduling MBS C, PDCCH 6 for scheduling MBS B, PDCCH 11 for scheduling MBS B, PDCCH 12 for scheduling MBS A). After arranging these PDCCHs according to the rule, the order of these PDCCHs is PDCCH 0, PDCCH 2, PDCCH 5, PDCCH 6, PDCCH 8, PDCCH 12, PDCCH 11, and PDCCH 14. Therefore, according to Table 1, the value of the first DAI in the PDCCH for scheduling unicast for UE 3 (e.g. PDCCH 5, PDCCH 8, and PDCCH 14) are 3, 1, 4, respectively, which denotes the accumulative number of PDCCH is 3, 5, 8, respectively.

For UE 3, there are five PDCCHs in total including PDCCHs for scheduling MBS that UE 3 receives (e.g. PDCCH 0 for scheduling MBS A, PDCCH 2 for scheduling MBS C, PDCCH 6 for scheduling MBS B) and PDCCH for scheduling unicast service for UE 3 (e.g. PDCCH 5 and PDCCH 8) on PDCCH monitoring occasion 0. Therefore, the value of the second DAI in the PDCCH transmitted on PDCCH monitoring occasion 0 for scheduling unicast for UE 3 (e.g. PDCCH 5 and PDCCH 8) is 1 according to Table 1. Similarly, there are three PDCCH in total including PDCCH for scheduling MBS that UE 3 receives (e.g. PDCCH 11 for scheduling MBS B, PDCCH 12 for scheduling MBS A) and PDCCH for scheduling unicast service for UE 3 (e.g. PDCCH 14) on PDCCH monitoring occasion 1. Therefore, the value of the second DAI in the PDCCH transmitted on PDCCH monitoring occasion 1 for scheduling unicast for UE 3 (e.g. PDCCH 14) is 3 according to Table 1.

A first DAI in a PDCCH scheduling unicast service indicates the accumulative number of PDCCH including PDCCH for scheduling unicast and PDCCH scheduling multicast up to the PDCCH, first in the ascending order of serving cell index, second in the order of service type (e.g. first MBS service then unicast service), then in the ascending order of PDCCH monitoring occasion index, where an ascending order of MBS session index is for multiple MBS sessions.

Still referring to FIG. 4, for UE 1, after arranging these PDCCHs according to the rule, the order of these PDCCHs is PDCCH 0, PDCCH 6, PDCCH 1, PDCCH 4, PDCCH 12, PDCCH 11, PDCCH 9, and PDCCH 13. Therefore, according to Table 1, the value of the first DAI in the PDCCH for scheduling unicast for UE 1 (e.g. PDCCH 1, PDCCH 4, PDCCH 9, and PDCCH 13) are 3, 4, 3, 4, respectively, which denotes the accumulative number of PDCCH is 3, 4, 7, 8, respectively.

For UE 2, after arranging PDCCHs according to the rule, the order of these PDCCHs is PDCCH 6, PDCCH 2, PDCCH 3, PDCCH 7, PDCCH 11, and PDCCH 10. Therefore, according to Table 1, the value of the first DAI in the PDCCH for scheduling unicast for UE 2 (e.g. PDCCH 3, PDCCH 7, and PDCCH 10) are 3, 4, 2, respectively, which denotes the accumulative number of PDCCH is 3, 4, 6, respectively.

For UE 3, after arranging these PDCCHs according to the rule, the order of these PDCCHs is PDCCH 0, PDCCH 6, PDCCH 2, PDCCH 5, PDCCH 8, PDCCH 12, PDCCH 11, and PDCCH 14. Therefore, according to Table 1, the value of the first DAI in the PDCCH for scheduling unicast for UE 3 (e.g. PDCCH 5, PDCCH 8, and PDCCH 14) are 4, 1, 4, respectively, which denotes the accumulative number of PDCCH is 4, 5, 8, respectively.

In some embodiments, a first DAI in a PDCCH on a PDCCH monitoring occasion for scheduling MBS indicates the accumulative number of PDCCH for MBS counting from the first PDCCH on the same PDCCH monitoring occasion for MBS up to current PDCCH in the order (e.g. descending order or ascending order) of PDSCH reception starting time, and/or serving cell, and/or PDCCH monitoring occasion. The first DAI in the PDCCH for MBS is updated from PDCCH monitoring occasion to PDCCH monitoring occasion. For example, a first DAI in a PDCCH on a PDCCH monitoring occasion for scheduling MBS indicates the accumulative number of PDCCH for MBS counting from the first PDCCH on the same PDCCH monitoring occasion for MBS up to current PDCCH, first in ascending order of MBS session index, second in ascending order of serving cell index, then in ascending order of the PDCCH monitoring occasion index.

Still referring to FIG. 4, there are three PDCCH for scheduling PDCCH MBS (e.g. PDCCH 0 for scheduling MBS A, PDCCH 2 for scheduling MBS C, and PDCCH 6 for scheduling MBS B) on PDCCH monitoring occasion 0. After arranging these PDCCH in accordance to the rule, the order of PDCCH is PDCCH 0, PDCCH 6, and PDCCH 2. The first PDCCH on PDCCH monitoring occasion 0 is PDCCH 0. Therefore, the value of the first DAI in these PDCCH (e.g. PDCCH 0, PDCCH 6, and PDCCH 2) is 1, 2, 3, respectively, according to Table 1, which indicates the accumulative number of PDCCH is 1, 2, and 3, respectively. There are two PDCCH for scheduling PDCCH MBS (e.g. PDCCH 11 for scheduling MBS B and PDCCH 12 for scheduling MBS A) on PDCCH monitoring occasion 1. After arranging these PDCCH in accordance to the rule, the order of PDCCH is PDCCH 12, PDCCH 11. The first PDCCH on PDCCH monitoring occasion 1 is PDCCH 12. Therefore, the value of the first DAI in these PDCCH (e.g. PDCCH 12 and PDCCH 11) is 1, 2, respectively, according to Table 1, which indicates the accumulative number of PDCCH is 1, 2, respectively.

In some embodiments, the HARQ-ACK codebook for the PDSCHs scheduled by the PDCCHs in the set are generated according to DAI in the PDCCHs. The HARQ codebook are generated in accordance to the order of the first DAI in the PDCCHs. An ACK is generated if the corresponding transport block is correctly decode. A NACK is generated if the corresponding transport block is not correctly decode. When a UE does not correctly decode a PDCCH in the set, NACK information is generated for the PDCCH. When a UE determines that a PDCCH is missed based on the DAI in the PDCCH that UE has received, NACK information is generated for the PDCCH.

Still referring to FIG. 4, it is assumed that all the PDCCHs in the set only schedule one transport block and one HARQ-ACK information bit corresponds to one transport block. For UE 1, the length of the generated HARQ-ACK information is 8, where the most significant bit of the generated HARQ-ACK information corresponds to the transport block scheduled by PDCCH 0, the second most significant bit corresponds to the transport block scheduled by PDCCH 1, and so on. That is to say, each bit of the generated HARQ-ACK information from the most significant bit to the least significant bit corresponds to the transport block scheduled by PDCCH 0, PDCCH 1, PDCCH 4, PDCCH 6, PDCCH 9, PDCCH 12, PDCCH 11, and PDCCH 13, respectively. When UE 1 determines that PDCCH 0 is missed based on, for example, the first DAI and second DAI in PDCCH 1, PDCCH 4 and PDCCH 6, a NACK information is generated for PDCCH 0.

For UE 2, the length of the generated HARQ-ACK information is 6, where each bit of the generated HARQ-ACK information from the most significant bit to the least significant bit corresponds to the transport block scheduled by PDCCH 2, PDCCH 3, PDCCH 6, PDCCH 7, PDCCH 11, and PDCCH 10, respectively.

In some embodiments, one or more transport blocks scheduling by a DCI are successfully decoded by a UE. When the order of the DCI cannot be determined, one or more NACK information is generated for these transport blocks. For example, the order of the DCI cannot be determined due to missed PDCCH, e.g. UE does not decode one or more PDCCH that the network transmits to the UE. The UE cannot determine that the detected PDCCH is before the missed PDCCH or the detected PDCCH is after the missed PDCCH. The NACK information are generated for these transport blocks.

Still referring to FIG. 4, UE 1 does not decode PDCCH 0 and successfully decode PDCCH 6, PDCCH 1 and PDCCH 4 on PDCCH monitoring occasion 0 and corresponding PDSCH, i.e. PDCCH 6 is missed by UE 1. From the perspective UE, UE 1 can determine that there is one missed PDCCH based on the first DAI in PDCCH 1. There may be two cases for the order of these PDCCH. For case 1, the order is missed PDCCH, PDCCH 6, PDCCH 1, and PDCCH 4, which is the correct order. For case 2, the order is PDCCH 6, missed PDCCH, PDCCH 1, and PDCCH 4 when the missed PDCCH is for scheduling unicast service for UE 1, which is the wrong order. But UE 1 cannot distinguish case 1 and case 2. UE 1 cannot determine which one is right. That is to say, UE 1 cannot determine the order of PDCCH 6. Therefore, NACK information is generated for the transport blocks scheduled by PDCCH 6.

In some embodiments, when the PDCCH transmitted on a cell and/or a PDCCH monitoring occasion to a UE exceeds the maximum number of PDCCH that the UE can receive (e.g., decode or detect) or the PDSCH transmitted on a cell and/or a slot to a UE exceeds the maximum number of PDSCH that the UE can receive, the UE may drop one or more of the PDCCH and/or PDSCH. That is, the UE will not receive (e.g., decode or detect) the one or more of the PDCCH and/or PDSCH, and ACK or NACK information (e.g., one or more ACK or NACK indications or bits) is generated for the dropped PDCCH and/or PDSCH. In an example, there are two PDSCH on a slot for a UE, but the UE can only decode at most one PDSCH on a slot. In this case, the UE only decodes one PDSCH and does not decode the other PDSCH, and consequently ACK or NACK information is generated for the other PDSCH.

Still referring to FIG. 4, it is assumed that UE 1 can only receive at most one PDCCH in a cell on a PDCCH monitoring occasion. There are two PDCCH in cell 0 on PDCCH monitoring occasion (PDCCH 0 and PDCCH 1) for UE 1 to receive. UE 1 can only decode one of these PDCCH and ACK or NACK information is generated for the other PDCCH.

In some embodiments, the network transmits only a PDCCH without a scheduled PDSCH to a UE. The PDCCH carries a DCI format for scheduling of PDSCH, such as DCI format 1_0, DCI format 1_1, DCI format 1_2, etc. The PDCCH has a first DAI and/or the second DAI in accordance to the embodiments. The PDCCH is the last PDCCH in the set. One or more fields in the DCI format carried by the PDCCH are set to a defined value to indicate that the DCI format does not schedule PDSCH. For example, the "frequency domain resource assignment" field in the DCI are of all zeros and/or the new data indicator in the DCI is set to be 0. In some embodiments, the PDCCH is received by a UE, one or more ACK information or NACK information are generated for the PDCCH.

Still referring to FIG. 4, the "frequency domain resource assignment" field in PDCCH 14 are of all zeros, which means that PDCCH 14 does not schedule any PDSCH. An ACK information or a NACK information is generated for PDCCH 14 in the HARQ-ACK codebook based on the assumption that all the PDCCHs in the set only schedule one transport block and one HARQ-ACK information bit corresponds to one transport block.

A PDCCH (or DCI format) includes at least one the following fields: identifier for DCI formats, carrier indicator, bandwidth part (BWP) indicator, frequency-domain resource assignment, time-domain resource assignment, virtual resource block to physical resource block (VRB-to-PRB), PRB bundling size indicator, rate matching indicator, zero power channel state information reference signal (ZP CSI-RS) trigger, modulation and coding scheme (MCS), new data indicator, redundancy version, HARQ process number, PDSCH-to-HARQ feedback timing indicator, antenna port(s), transmission configuration indication, SRS request, code book group (CBG) transmission information, CBG flushing out information, and DMRS sequence initialization. In an example, one or more fields in the DCI format are set to a defined value to indicate that the DCI format does not schedule PDSCH.

Example Embodiments for HARQ Codebook Transmission

In some embodiments, there are only PDCCH scheduling transport blocks for MBS for a UE on a first PDCCH monitoring occasion, and the UE transmits the HARQ-ACK codebook on a PUCCH. The PUCCH resource is indicated by a PDCCH transmitted on a PDCCH monitoring occasion before the first PDCCH monitoring occasion for scheduling unicast service for the UE. The HARQ-ACK codebook includes at least the HARQ-ACK information for the transport blocks of MBS.

In some embodiments, the first PDCCH monitoring occasion is configured for transmitting PDCCH to schedule a plurality of MBS sessions. A HARQ-ACK codebook is generated for the plurality of MBS sessions in the order (ascending order or descending order) of the MBS session. When a UE does not decode a PDCCH for scheduling one of the plurality of MBS session, NACK information is generated for the MBS session.

Figure 5:
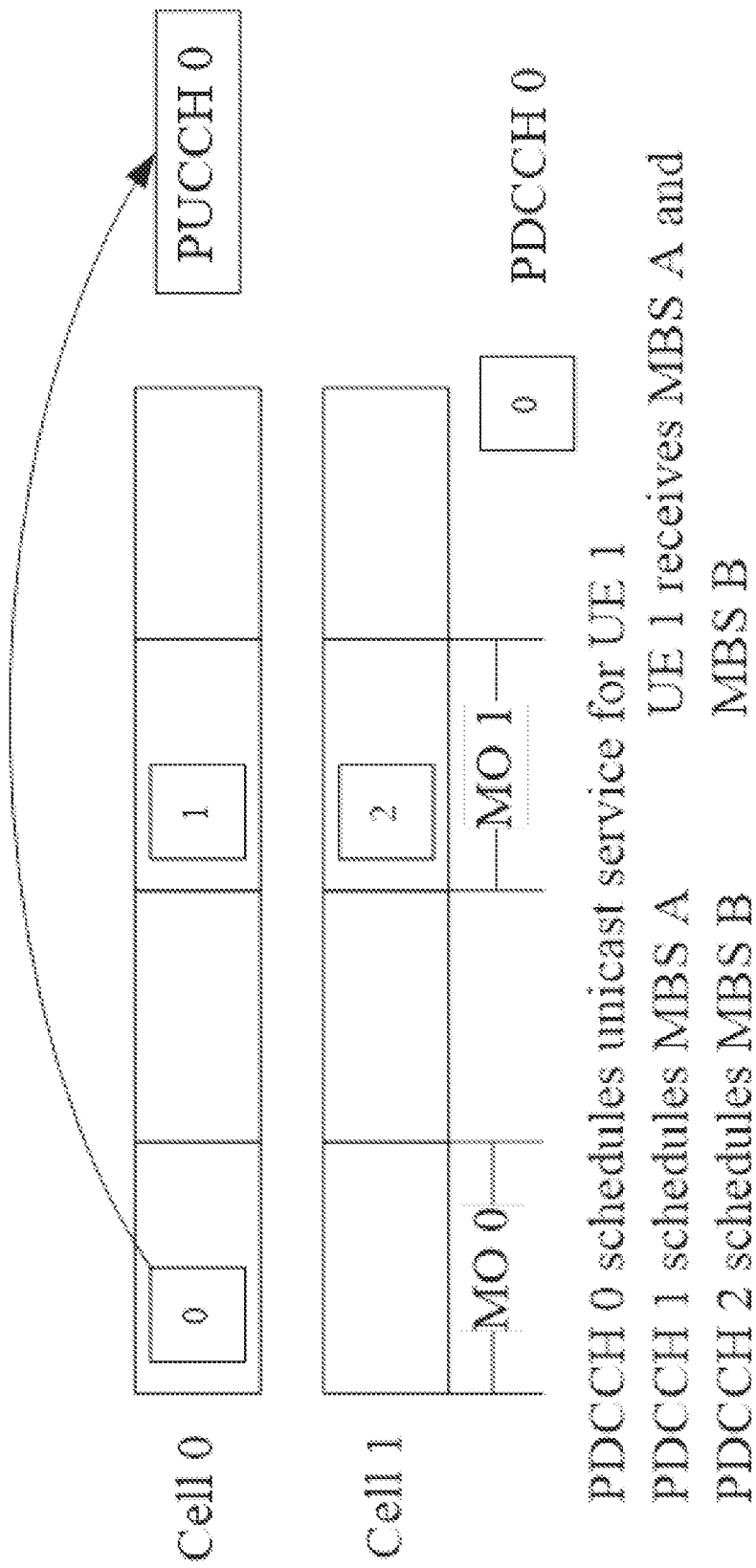
FIG. 5 shows an example of HARQ-ACK codebook transmission.

FIG. 5 shows an example of HARQ-ACK codebook transmission. As shown therein, there are two MBS sessions (denoted by MBS A and MBS B, where MBS A index is less than MBS B index) and two cells (denoted by cell 0 and cell 1) configured for UE 1. UE 1 receives MBS A and MBS B simultaneously. For UE 1, the set of PDCCH includes PDCCH for scheduling unicast service for UE 1 and PDCCH for scheduling MBS A and PDCCH for MB S B. There are 3 PDCCHs (denoted by PDCCH 0~2, respectively) for scheduling MBS or unicast service for UE 1. PDCCH 0 transmitted on PDCCH monitoring 0 in cell 0 schedules unicast service for UE 1. PUCCH resource 0 is indicated by the PDCCH 0. PDCCH 1 transmitted on PDCCH monitoring 1 in cell 0 schedules MBS A. PDCCH 2 transmitted on PDCCH monitoring 1 in cell 1 schedules MBS B.

As shown in FIG. 5, there are only PDCCH for scheduling MBS (e.g. PDCCH 1 and PDCCH 2) on PDCCH monitoring occasion 1. PDCCH 0 is transmitted on PDCCH monitoring occasion 0 and for scheduling uncast service for UE 1. Therefore, the HARQ-ACK codebook for the transport blocks for PDCCH 0, PDCCH 1 and PCCH 2 is transmitted on PUCCH resource 0. The configuration, wherein PDCCH schedules MBS A and PDCCH schedules MBS B, may be transmitted on PDCCH monitoring occasion 1 for a UE. The UE monitors PDCCH on PDCCH monitoring occasion 1 for MBS A and MBS B. When a UE does not decode PDCCH 1, NACK information is generated for MBS A. When a UE does not decode PDCCH 2, NACK information is generated for MBS B. When a UE does not decode PDCCH 1 and PDCCH 2, NACK information are generated for MBS A and MBS B.

Example Embodiments for Associating Control Information to a HARQ Process

In some embodiments, an association method includes, receiving by a wireless device from a wireless node, a DCI scheduling a transmission including one or more Transport Blocks (TBs), and associating the DCI with a HARQ process according to a radio network temporary identifier (RNTI) or a HARQ ID of the DCI.

In some embodiments, the one or more TBs and the corresponding transmission information are allocated to a HARQ process in response to determining that a new data indicator in the DCI is toggled compared to the value of a previously received transmission corresponding to the RNTI and HARQ ID of the DCI, wherein the HARQ process is associated with another DCI corresponding to the RNTI and the HARQ ID of the DCI.

In some embodiments, the one or more TBs and the corresponding transmission information are allocated to an unoccupied HARQ process in response to determining the transmission is the very first received transmission.

In some embodiments, the transmission is considered to be a new transmission. In other embodiments, the transmission is considered to be a retransmission.

In some embodiments, the DCI is associated with the HARQ process.

In some embodiments, the HARQ buffer is flushed in response to determining the buffer of the HARQ process is not empty.

In some embodiments, the HARQ buffer is flushed in response to determining the buffer of the unoccupied HARQ process is not empty.

In some embodiments, the one or more TBs are allocated to a HARQ process in response to determining a new data indicator in the DCI is not toggled compared to the value of a previously received transmission corresponding to the RNTI and HARQ ID of the DCI for the HARQ process according to its associated DCI.

In some embodiments, the HARQ process is considered to be unoccupied in response to decoding the corresponding transport blocks successfully.

In some embodiments, a HARQ entity maintains a plurality of parallel HARQ processes. Each HARQ process is associated with a DCI in which the UE is interested. This interest is as determined by the RNTI and/or the HARQ ID of the DCI. The transmission information and the transport blocks (TB) scheduled by a DCI are transferred to the HARQ process. The transmission information includes at least one of the new data indicator in the DCI, an RNTI for scrambling the DCI, a HARQ ID in the DCI. In an example, the RNTI can be a Group RNTI (G-RNTI), a Cell RNTI (C-RNTI), or a Sidelink RNTI (SL-RNTI).

In an example, a UE receives a first DCI with a HARQ process ID. The first DCI is scrambled by an RNTI. The first DCI schedules a transmission, which includes one or more transport blocks. When the new data indicator (NDI) in the first DCI has been toggled compared to the value of a previously received transmission corresponding to the RNTI and HARQ ID of the first DCI, the TBs scheduled by the first DCI and the corresponding transmission information are allocated to a HARQ process, where the HARQ process is associated with a DCI corresponding to the RNTI and the HARQ ID of the first DCI. The transmission scheduled by the first DCI is considered to be a new transmission. The HARQ process is associated with the first DCI. If the HARQ buffer of the HARQ process is not empty, the HARQ buffer is flushed.

When this is the very first received transmission for the RNTI and the HARQ ID of the first DCI, the TBs scheduled by the first DCI and the corresponding transmission information are allocated to an unoccupied HARQ process. The unoccupied HARQ process is associated with the first DCI. In this case, the transmission is considered to be a new transmission. If the HARQ buffer of the unoccupied HARQ process is not empty, the HARQ buffer is flushed. For example, when there is no HARQ process associated with a DCI corresponding to the RNTI and the HARQ ID of the first DCI, the TBs scheduled by the first DCI and the corresponding transmission information are allocated to an unoccupied HARQ process.

When the NDI in the first DCI has not been toggled compared to the value of a previously received transmission corresponding to the RNTI and HARQ ID of the first DCI for the HARQ process according to its associated DCI, the TBs scheduled by the first DCI and the corresponding transmission information are allocated to the HARQ process. In this case, the transmission scheduled by the first DCI is considered to be a retransmission.

When the transport blocks scheduled by a DCI are successfully decoded, the HARQ process associated with the DCI is considered to be an unoccupied HARQ process.

In an example, a UE receives a first DCI scheduling a first transmission. The HARQ ID in the first DCI is 3. The first DCI is scrambled by a first G-RNTI. The NDI in the first DCI is 0. There is a first HARQ process associated with a second DCI. The HARQ ID in the second DCI is 3. The second DCI is scrambled by a first G-RNTI. If the NDI in the second DCI is 1, that is to say the NDI in the first DCI is toggled compared to the transmission scheduled by the second DCI, the TBs scheduled by the first DCI and the corresponding first transmission information is allocated to the first HARQ process. The first HARQ process is associated with the first DCI. That is, the first HARQ process will not be associated with the second DCI. In this case, the first transmission is considered to be a new transmission.

If the HARQ buffer of the first HARQ process is not empty, the HARQ buffer is flushed. If the NDI in the second DCI is 0, i.e., the NDI in the first DCI is not toggled compared to the transmission scheduled by the second DCI, the TBs scheduled by the first DCI and the corresponding first transmission information are allocated to the first HARQ process. In this case, the first transmission is considered to be a retransmission. If there is no HARQ process associated with a DCI, where the HARQ ID of the DCI is 3 and the DCI is scrambled by a first G-RNTI, the TBs scheduled by the first DCI and the corresponding transmission information are allocated to an unoccupied HARQ process.

In an example, a UE receives a first DCI with a HARQ process ID. The first DCI is scrambled by an RNTI. The first DCI schedules a transmission, which includes one or more transport blocks. When the new data indicator (NDI) in the first DCI has been toggled compared to the value of a previously received transmission corresponding to the RNTI of the first DCI, the TBs scheduled by the first DCI and the corresponding transmission information are allocated to a HARQ process, where the HARQ process is associated with a DCI corresponding to the RNTI of the first DCI. In this case, the transmission scheduled by the first DCI is considered to be a new transmission. The HARQ process is associated with the first DCI. If the HARQ buffer of the HARQ process is not empty, the HARQ buffer is flushed.

When this is the very first received transmission for the RNTI of the first DCI, the TBs scheduled by the first DCI and the corresponding transmission information are allocated to an unoccupied HARQ process. The unoccupied HARQ process is associated with the first DCI. In this case, the transmission is considered to be a new transmission. If the HARQ buffer of the unoccupied HARQ process is not empty, the HARQ buffer is flushed. In an example, when there is no HARQ process associated with a DCI corresponding to the RNTI of the first DCI, the TBs scheduled by the first DCI and the corresponding transmission information are allocated to an unoccupied HARQ process.

When the NDI in the first DCI has not been toggled compared to the value of a previously received transmission corresponding to the RNTI of the first DCI for the HARQ process according to its associated DCI, the TBs scheduled by the first DCI and the corresponding transmission information are allocated to the HARQ process. In this case, the transmission scheduled by the first DCI is considered to be a retransmission.

In some embodiments, a control information is associated with a HARQ process according to the parameter set of the control information. The parameter set includes at least one of a HARQ ID, a scrambling RNTI, a Destination Layer-1 ID, and a Source Layer-1 ID in the control information. The control information can be downlink control information (DCI), uplink control information (UCI), or sidelink control information (SCI).

In an example, a UE receives a first control information for scheduling a transmission, which includes one or more transport blocks. When the new data indicator (NDI) in the first control information has been toggled compared to the value of a previously received transmission corresponding to the parameter set of the first control information, the TBs scheduled by the first control information and the corresponding transmission information are allocated to a HARQ process, where the HARQ process is associated with another control information corresponding to the parameter set of the first control information. In this case, the transmission scheduled by the first control information is considered to be a new transmission. The HARQ process is associated with the first control information. If the HARQ buffer of the HARQ process is not empty, the HARQ buffer is flushed.

When this is the very first received transmission for the parameter set of the first control information, the TBs scheduled by the first control information and the corresponding transmission information are allocated to an unoccupied HARQ process. The unoccupied HARQ process is associated with the first control information. In this case, the transmission is considered to be a new transmission. If the HARQ buffer of the unoccupied HARQ process is not empty, the HARQ buffer is flushed. For example, when there is no HARQ process associated with a control information corresponding to the parameter set of the first control information, the TBs scheduled by the first control information and the corresponding transmission information are allocated to an unoccupied HARQ process.

When the NDI in the first control information has not been toggled compared to the value of a previously received transmission corresponding to the parameter set of the first control information for the HARQ process according to its associated control information, the TBs scheduled by the first control information and the corresponding transmission information are allocated to the HARQ process. In this case, the transmission scheduled by the first control information is considered to be a retransmission.

In an example, a UE receives a first SCI with a Destination Layer-1 ID and a Source Layer-1 ID. The first SCI schedules a transmission, which includes one or more transport blocks. When the new data indicator (NDI) in the first SCI has been toggled compared to the value of a previously received transmission corresponding to the pair of the Destination Layer-1 ID and the Source Layer-1 ID of the first SCI, the TBs scheduled by the first SCI and the corresponding transmission information are allocated to a HARQ process, where the HARQ process is associated with another SCI corresponding to the pair of the Destination Layer-1 ID and the Source Layer-1 ID of the first SCI. In this case, the transmission scheduled by the first SCI is considered to be a new transmission. The HARQ process is associated with the first SCI. If the HARQ buffer of the HARQ process is not empty, the HARQ buffer is flushed.

When this is the very first received transmission for the for the pair of the Destination Layer-1 ID and the Source Layer-1 ID of the first SCI, the TBs scheduled by the first SCI and the corresponding transmission information are allocated to an unoccupied HARQ process. The unoccupied HARQ process is associated with the first SCI. In this case, the transmission is considered to be a new transmission. If the HARQ buffer of the unoccupied HARQ process is not empty, the HARQ buffer is flushed. For example, when there is no HARQ process associated with a SCI corresponding to the pair of the Destination Layer-1 ID and the Source Layer-1 ID of the first SCI, the TBs scheduled by the first SCI and the corresponding transmission information are allocated to an unoccupied HARQ process.

When the NDI in the first SCI has not been toggled compared to the value of a previously received transmission corresponding to the pair of the Destination Layer-1 ID and the Source Layer-1 ID of the first SCI for the HARQ process according to its associated SCI, the TBs scheduled by the first SCI and the corresponding transmission information is allocated to the HARQ process. In this case, the transmission scheduled by the first SCI is considered to be a retransmission.

Example Methods and Implementations for the Disclosed Technology

Figure 6A:
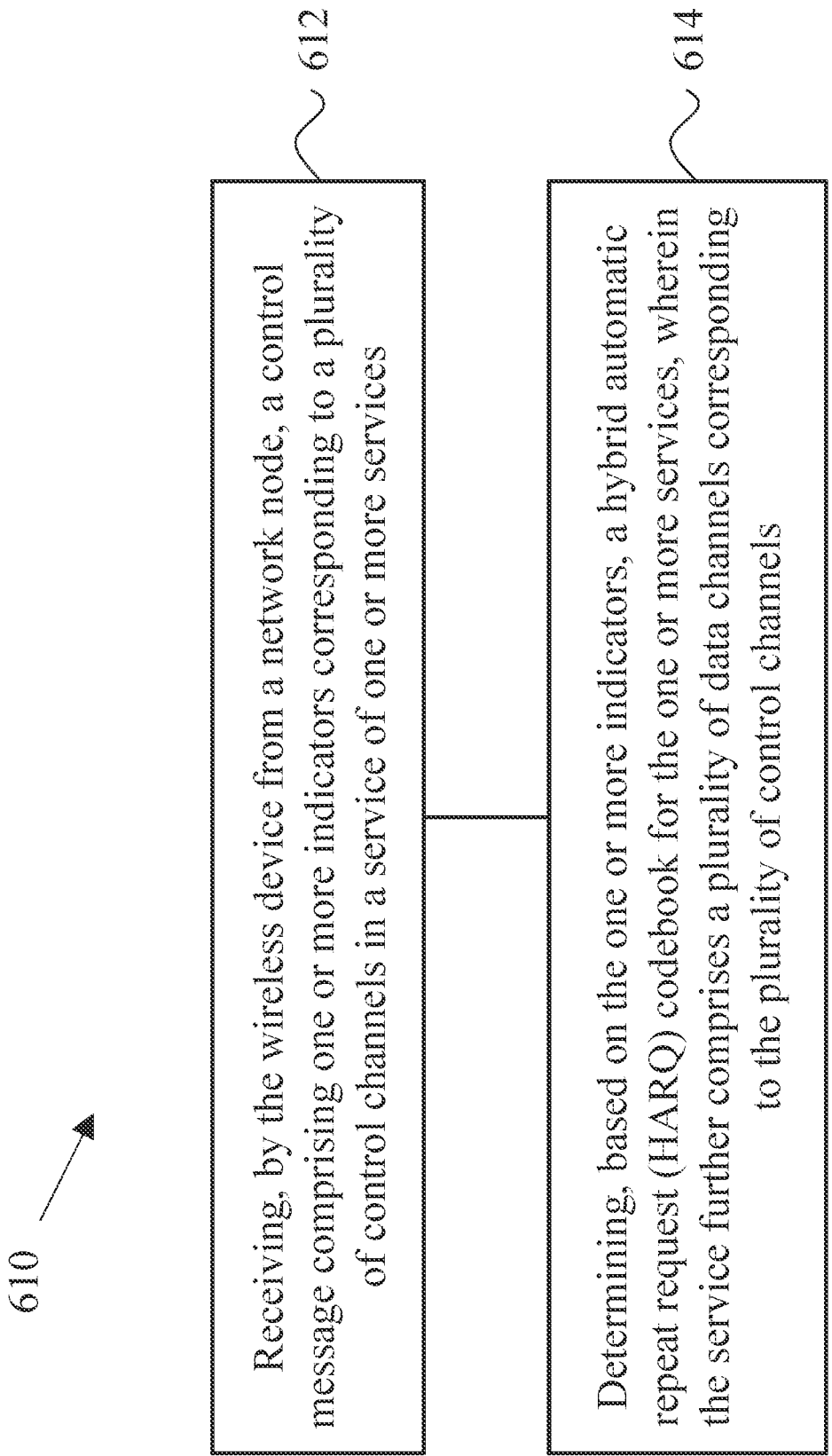

FIG. 6A shows an example of a wireless communication method. The method 610 includes, at operation 612, receiving, by a wireless device from a network node, a control message comprising one or more indicators corresponding to a plurality of control channels in a service of one or more services.

The method 610 includes, at operation 614, determining, based on the one or more indicators, a hybrid automatic repeat request (HARQ) codebook for the one or more services, wherein the service further comprises a plurality of data channels corresponding to the plurality of control channels.

Figure 6B:
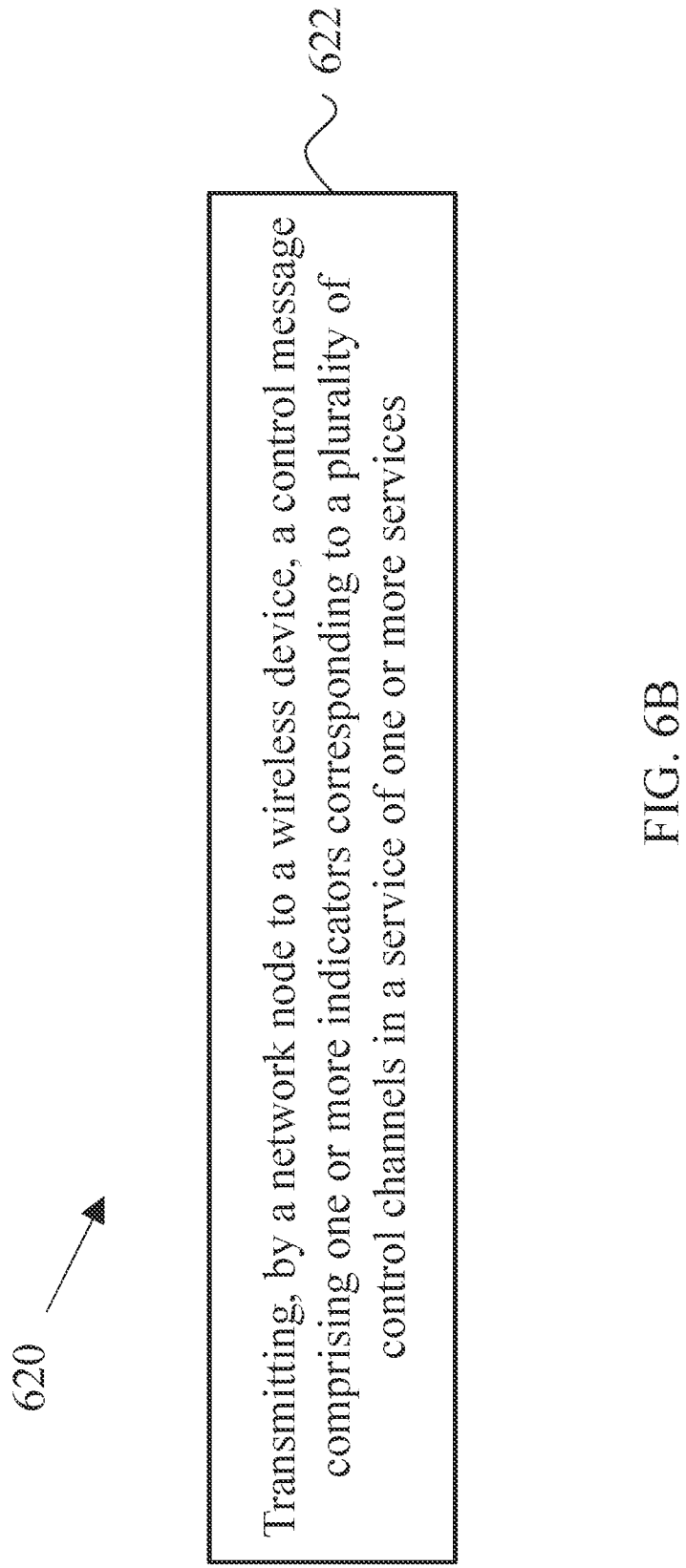

FIG. 6B shows an example of a wireless communication method. The method 620 includes, at operation 622, transmitting, by a network node to a wireless device, a control message comprising one or more indicators corresponding to a plurality of control channels in a service of one or more services, wherein the wireless device is configured to determine a hybrid automatic repeat request (HARQ) codebook for the one or more services based on the one or more indicators, and wherein the service further comprises a plurality of data channels corresponding to the plurality of control channels.

In some embodiments, a first indicator of the one or more indicators for scheduling the service indicates an accumulated number of the plurality of control channels.

In some embodiments, values of a first indicator of the one or more indicators are cyclic (e.g., as described in the context of FIG. 2).

In some embodiments, a HARQ sub-codebook is determined for each of the one or more services.

In some embodiments, the HARQ sub-codebook corresponds to a data channel group comprising one or more of the plurality of data channels.

In some embodiments, a first data channel of the one or more of the plurality of data channels corresponds to an earliest data channel for which the wireless device has not generated a corresponding HARQ sub-codebook.

In some embodiments, a first data channel of the one or more of the plurality of data channels corresponds to a data channel scheduled by the control message with an indicator set to be a first value for a first indicator of the one or more indicators and is not subsequent to another data channel for which the wireless device has not generated a corresponding HARQ sub-codebook.

In some embodiments, a last data channel of the one or more of the plurality of data channels corresponds to a latest data channel prior to a time interval before a resource on which the HARQ codebook is transmitted.

In some embodiments, a last data channel of the one or more of the plurality of data channels corresponds to a data channel scheduled by a control channel, wherein the HARQ codebook is transmitted on a resource indicated by the control channel.

In some embodiments, the resource is a Physical Uplink Control Channel.

In some embodiments, the HARQ codebook is determined by concatenating the HARQ sub-codebook for each of the one or more services.

In some embodiments, the control message is a downlink control information (DCI) message, wherein an indicator of the one or more indicators is a downlink assignment indicator (DAI), wherein the service is a multicast and broadcast service (MBS), wherein a control channel of the plurality of control channels is a physical downlink control channel (PDCCH), and wherein a data channel of the plurality of data channels is a physical downlink shared channel (PDSCH).

Figure 6C:
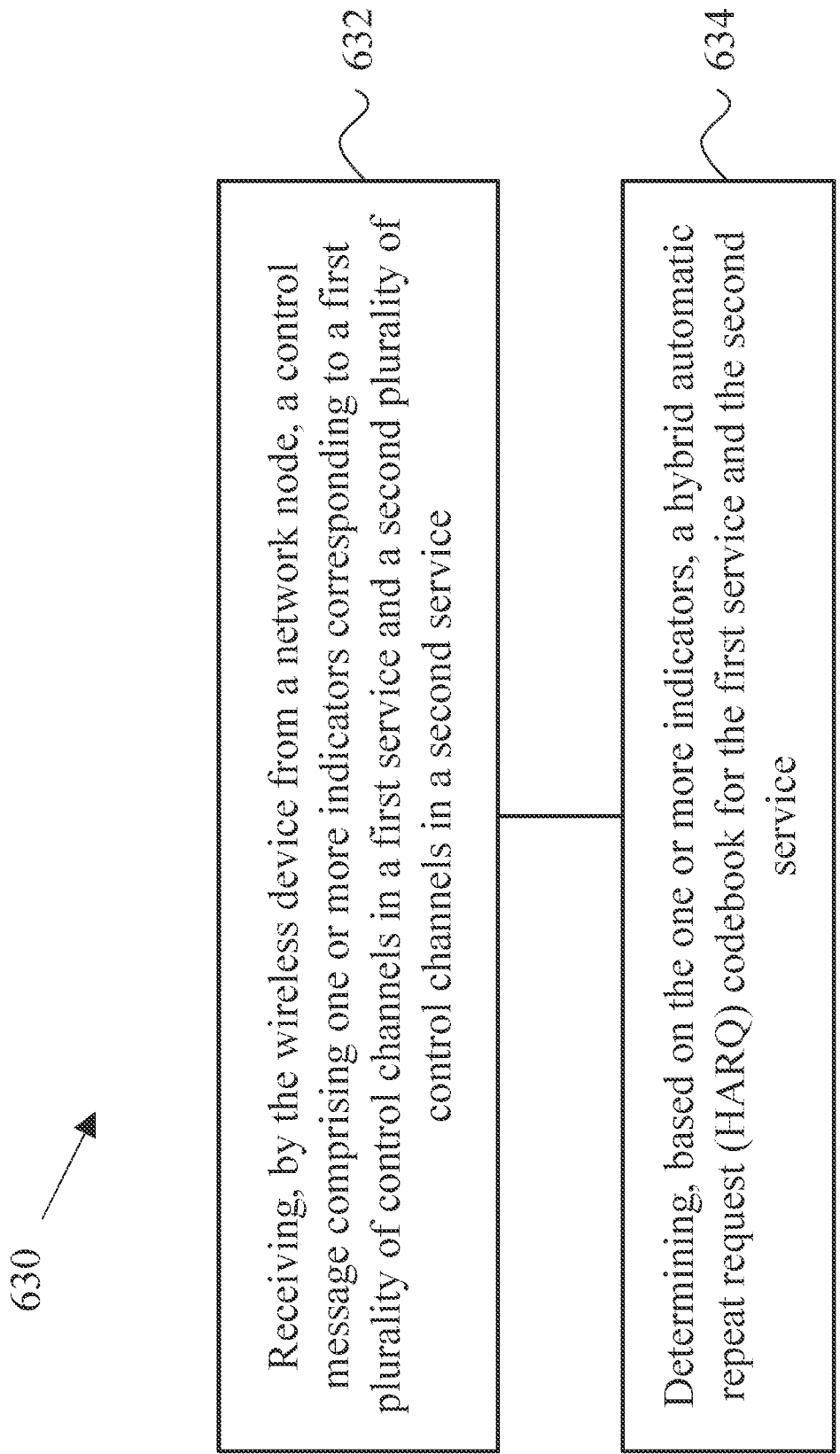

FIG. 6C shows an example of a wireless communication method. The method 630 includes, at operation 632, receiving, by a wireless device from a network node, a control message comprising one or more indicators corresponding to a first plurality of control channels in a first service and a second plurality of control channels in a second service.

The method 630 includes, at operation 634, determining, based on the one or more indicators, a hybrid automatic repeat request (HARQ) codebook for the first service and the second service.

FIG. 6D shows an example of a wireless communication method. The method 640 includes, at operation 642, transmitting, by a network node to a wireless device, a control message comprising one or more indicators corresponding to a first plurality of control channels in a first service and a second plurality of control channels in a second service, wherein the wireless device is configured to determine a hybrid automatic repeat request (HARQ) codebook for the first service and the second service.

In some embodiments, a first indicator of the one or more indicators for scheduling the second service indicates an accumulated number of control channels in the second service up to a current control channel in an order.

In some embodiments, a second indicator of the one or more indicators for scheduling the second service indicates a total number of control channels in the second service for a corresponding monitoring occasion.

In some embodiments, a first indicator of the one or more indicators for scheduling the first service indicates an accumulated number of control channels in the first service and the second service up to a current control channel in an order.

In some embodiments, a second indicator of the one or more indicators for scheduling the first service indicates a total number of control channels in the first service and the second service for a corresponding monitoring occasion.

In some embodiments, the order is based on at least one of a reception starting time of a control channel, a serving cell index, a broadcast service session, a service type, and a monitoring occasion for the control channel.

In some embodiments, a negative acknowledgement (NACK) for a data channel in the HARQ codebook is generated when the corresponding order cannot be determined.

In some embodiments, an acknowledgement (ACK) or a negative ACK (NACK) in the HARQ codebook for a control channel without a data channel is indicated by setting one or more fields in the control channel to a predefined value.

In some embodiments, the HARQ codebook is transmitted from the wireless device to the network node on a resource indicated by a last control channel in the first service when a remaining number of the one or more indicators are only for scheduling the second service on a last monitoring occasion.

In some embodiments, the resource is a Physical Uplink Control Channel.

In some embodiments, the first service is a unicast service and the second service is a broadcast service, wherein the control message is a downlink control information (DCI) message, wherein an indicator of the one or more indicators is a downlink assignment indicator (DAI), and wherein a control channel of the plurality of control channels is a physical downlink control channel (PDCCH).

Figure 7:
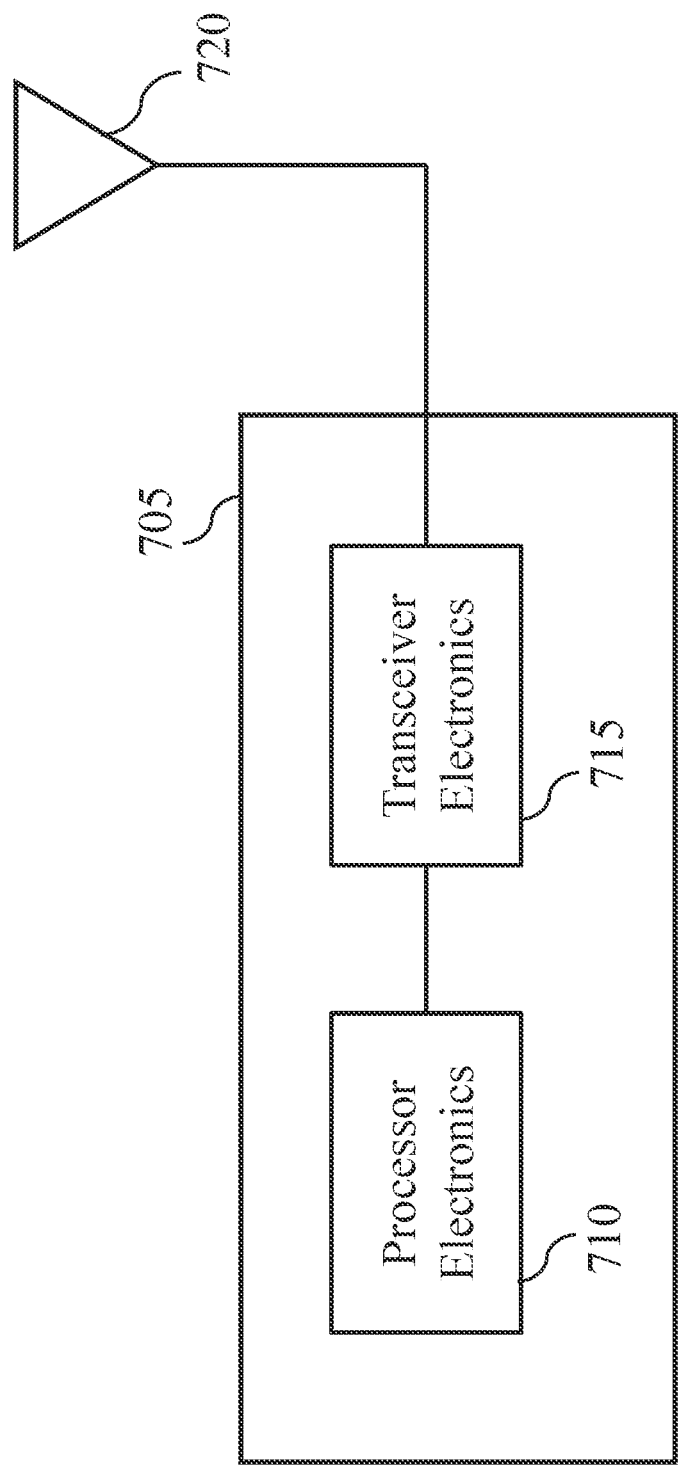
FIG. 7 is a block diagram representation of a portion of an apparatus that can be used to implement methods and techniques described in this document.

FIG. 7 is a block diagram representation of a portion of an apparatus, in accordance with some embodiments of the presently disclosed technology. An apparatus 705, such as a base station or a wireless device (or UE), can include processor electronics 710 such as a microprocessor that implements one or more of the techniques presented in this document. The apparatus 705 can include transceiver electronics 715 to send and/or receive wireless signals over one or more communication interfaces such as antenna(s) 720. The apparatus 705 can include other communication interfaces for transmitting and receiving data. Apparatus 705 can include one or more memories (not explicitly shown) configured to store information such as data and/or instructions. In some implementations, the processor electronics 710 can include at least a portion of the transceiver electronics 715. In some embodiments, at least some of the disclosed techniques, modules or functions are implemented using the apparatus 705.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication comprising:
   receiving, by a wireless device from a network node, a first downlink control information (DCI) format comprising a first downlink assignment indicator (DAI) corresponding to one or more first physical downlink control channels (PDCCHs) in a unicast service;
   receiving, by the wireless device from the network node, a second DCI format comprising a second DAI corresponding to one or more second PDCCHs in a multicast service,
   wherein each of the first DAI for the unicast service and the second DAI for the multicast service indicates an accumulated number of PDCCHs that schedules one or more physical downlink shared channels (PDSCHs) up to a current PDCCH first in an ascending order of PDSCH reception starting time for a same serving cell and PDCCH monitoring occasion, second in an ascending order of serving cell index, then in an ascending order of PDCCH monitoring occasion index; and
   determining, based on the first DAI and the second DAI, a hybrid automatic repeat request (HARQ) codebook for the unicast service and the multicast service, wherein the HARQ codebook is determined by:
      determining a first HARQ sub-codebook for the unicast service and a second HARQ sub-codebook for the multicast service, and
      concatenating the first HARQ sub-codebook and the second HARQ sub-codebook.

2. The method of claim 1, further comprising:
   transmitting the HARQ codebook from the wireless device to the network node on a resource indicated by a last control channel in the unicast service.

3. The method of claim 2, wherein the resource is a physical uplink control channel (PUCCH).

4. The method of claim 1, wherein a PDCCH corresponds to a {serving cell, PDCCH, monitoring occasion}-pair.

5. A method of wireless communication comprising:
   transmitting, by a network node to a wireless device, a first downlink control information (DCI) format comprising a first downlink assignment indicator (DAI) corresponding to one or more first physical downlink control channels (PDCCHs) in a unicast service;
   transmitting, by the network node to the wireless device, a second DCI format comprising a second DAI corresponding to one or more second PDCCHs in a multicast service,
   wherein each of the first DAI for the unicast service and the second DAI for the multicast service indicates an accumulated number of PDCCHs that schedules one or more physical downlink shared channels (PDSCHs) up to a current PDCCH first in an ascending order of PDSCH reception starting time for a same serving cell and PDCCH monitoring occasion, second in an ascending order of serving cell index, then in an ascending order of PDCCH monitoring occasion index; and
   wherein the wireless device is configured to determine, based on the first DAI and the second DAI, a hybrid automatic repeat request (HARQ) codebook for the unicast service and the multicast service, wherein the HARQ codebook is determined by:
      determining a first HARQ sub-codebook for the unicast service and a second HARQ sub-codebook for the multicast service, and
      concatenating the first HARQ sub-codebook and the second HARQ sub-codebook.

6. The method of claim 5, further comprising:
   receiving the HARQ codebook from the wireless device on a resource indicated by a last control channel in the unicast service.

7. The method of claim 6, wherein the resource is a physical uplink control channel (PUCCH).

8. The method of claim 5, wherein a PDCCH corresponds to a {serving cell, PDCCH, monitoring occasion}-pair.

9. An apparatus for wireless communication comprising processor electronics and a memory storing instructions, execution of which by the processor electronics causes the apparatus to perform operations comprising:
   receiving, from a network node, a first downlink control information (DCI) format comprising a first downlink assignment indicator (DAI) corresponding to one or more first plurality of physical downlink control channels (PDCCHs) in a unicast service;
   receiving, from the network node, a second DCI format comprising a second DAI corresponding to one or more second PDCCHs in a multicast service,
   wherein each of the first DAI for the unicast service and the second DAI for the multicast service indicates an accumulated number of PDCCHs that schedules one or more physical downlink shared channels (PDSCHs) up to a current PDCCH first in an ascending order of PDSCH reception starting time for a same serving cell and PDCCH monitoring occasion, second in an ascending order of serving cell index, then in an ascending order of PDCCH monitoring occasion index; and
   determining, based on the first DAI and the second DAI, a hybrid automatic repeat request (HARQ) codebook for the unicast service and the multicast service, wherein the HARQ codebook is determined by:
      determining a first HARQ sub-codebook for the unicast service and a second HARQ sub-codebook for the multicast service, and
      concatenating the first HARQ sub-codebook and the second HARQ sub-codebook.

10. The apparatus of claim 9, wherein the operations further comprise:
    transmitting the HARQ codebook to the network node on a resource indicated by a last control channel in the unicast service.

11. The apparatus of claim 10, wherein the resource is a physical uplink control channel (PUCCH).

12. The apparatus of claim 9, wherein a PDCCH corresponds to a {serving cell, PDCCH, monitoring occasion}-pair.

13. An apparatus for wireless communication comprising processor electronics and a memory storing instructions, execution of which by the processor electronics causes the apparatus to perform operations comprising:
   transmitting, to a wireless device, a first downlink control information (DCI) format comprising a first downlink assignment indicator (DAI) corresponding to one or more first physical downlink control channels (PDCCHs) in a unicast service;
   transmitting, to the wireless device, a second DCI format comprising a second DAI corresponding to one or more second PDCCHs in a multicast service,
   wherein each of the first DAI for the unicast service and the second DAI for the multicast service indicates an accumulated number of PDCCHs that schedules one or more physical downlink shared channels (PDSCHs) up to a current PDCCH first in an ascending order of PDSCH reception starting time for a same serving cell and PDCCH monitoring occasion, second in an ascending order of serving cell index, then in an ascending order of PDCCH monitoring occasion index; and
   wherein the wireless device is configured to determine, based on the first DAI and the second DAI, a hybrid automatic repeat request (HARQ) codebook for the unicast service and the multicast service, wherein the HARQ codebook is determined by:
      determining a first HARQ sub-codebook for the unicast service and a second HARQ sub-codebook for the multicast service, and
      concatenating the first HARQ sub-codebook and the second HARQ sub-codebook.

14. The apparatus of claim 13, wherein the operations further comprise:
   receiving the HARQ codebook from the wireless device on a resource indicated by a last control channel in the unicast service.

15. The apparatus of claim 14, wherein the resource is a physical uplink control channel (PUCCH).

16. The apparatus of claim 13, wherein a PDCCH corresponds to a {serving cell, PDCCH, monitoring occasion}-pair.

* * * * *

UNITED STATES PATENT AND TRADEMARK OFFICE
CERTIFICATE OF CORRECTION

PATENT NO. : 12,452,003 B2  
APPLICATION NO. : 18/165508  
DATED : October 21, 2025  
INVENTOR(S) : Shuaihua Kou et al.

Page 1 of 1

It is certified that error appears in the above-identified patent and that said Letters Patent is hereby corrected as shown below:

On the Title Page  
On Page 2, in Item (56), under "OTHER PUBLICATIONS", in Column 2, Line 9, delete "Wg 1" and insert -- WG1 --, therefor.

In the Specification  
In Column 4, Line 12, delete "Nis" and insert -- N is --, therefor.  
In Column 4, Line 42, delete "MB S" and insert -- MBS --, therefor.  
In Column 6, Line 56, delete "MB S" and insert -- MBS --, therefor.  
In Column 14, Line 6, delete "MB S" and insert -- MBS --, therefor.

In the Claims  
In Column 22, Line 11, in Claim 5, delete "DAL," and insert -- DAI, --, therefor.  
In Column 22, Line 35, in Claim 9, delete "first plurality of" and insert -- first --, therefor.

Signed and Sealed this  
Ninth Day of December, 2025

John A. Squires  
*Director of the United States Patent and Trademark Office*